J. A. NORTON.
IRRIGATING APPARATUS.
APPLICATION FILED JUNE 4, 1920.

1,387,165.

Patented Aug. 9, 1921.
4 SHEETS—SHEET 1.

Inventor
James A. Norton,
By - Hiram A. Sturges,
Attorney

J. A. NORTON.
IRRIGATING APPARATUS.
APPLICATION FILED JUNE 4, 1920.

1,387,165.

Patented Aug. 9, 1921.
4 SHEETS—SHEET 3.

Inventor
James A. Norton,
Hiram A. Sturges,
Attorney

J. A. NORTON.
IRRIGATING APPARATUS.
APPLICATION FILED JUNE 4, 1920.
1,387,165.
Patented Aug. 9, 1921.
4 SHEETS—SHEET 4.
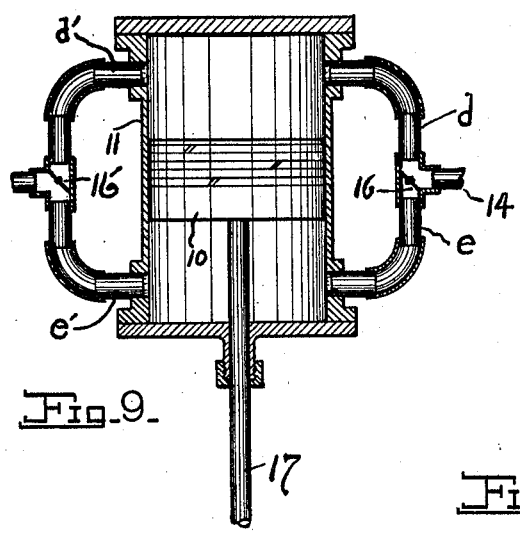
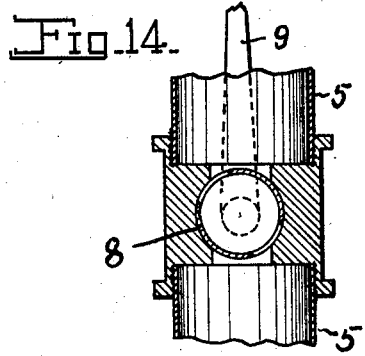
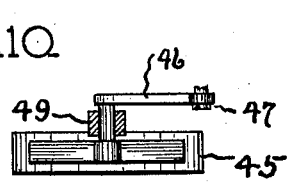
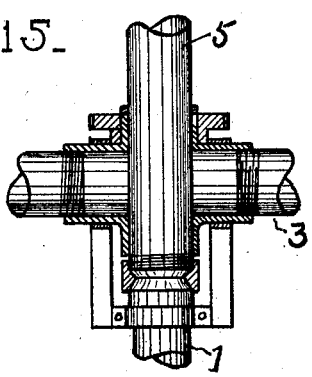
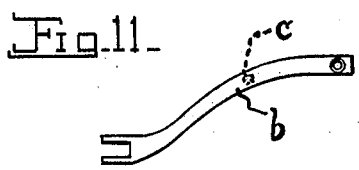
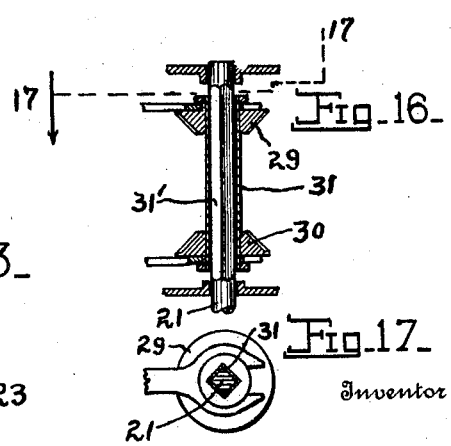
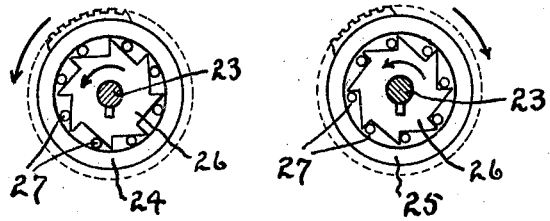
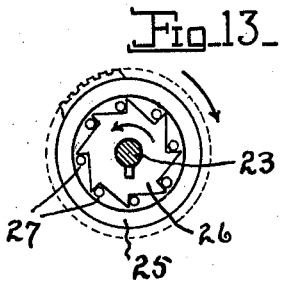
Inventor
James A. Norton,
By Hiram A. Sturges,
Attorney

UNITED STATES PATENT OFFICE.

JAMES A. NORTON, OF ODEBOLT, IOWA.

IRRIGATING APPARATUS.

1,387,165. Specification of Letters Patent. Patented Aug. 9, 1921.

Application filed June 4, 1920. Serial No. 386,575.

*To all whom it may concern:*

Be it known that I, JAMES A. NORTON, a citizen of the United States, residing at Odebolt, in the county of Sac and State of Iowa, have invented certain new and useful Improvements in an Irrigating Apparatus, of which the following is a specification.

This invention relates to an irrigating apparatus, and has for its object to provide means which will operate automatically for sprinkling or irrigating comparatively large rectangular areas, the device being of particular advantage for use in gardens, orchards, or the like, since the delivery of water is from a stationary support above the ground and is practically uniform.

The invention includes briefly, an upright tube provided with a nozzle and a sprinkler together with certain mechanism mounted thereon, whereby water under pressure while passing through the tube will cause a revoluble movement thereof, the inclination of the nozzle and volume of water being coincidently and automatically changed to conform to the distance from the center to the farthest part of the rectangular area to be irrigated.

The invention is illustrated in the accompanying drawing and its novel features are fully described hereinafter and in the appended claims.

Figure 1:
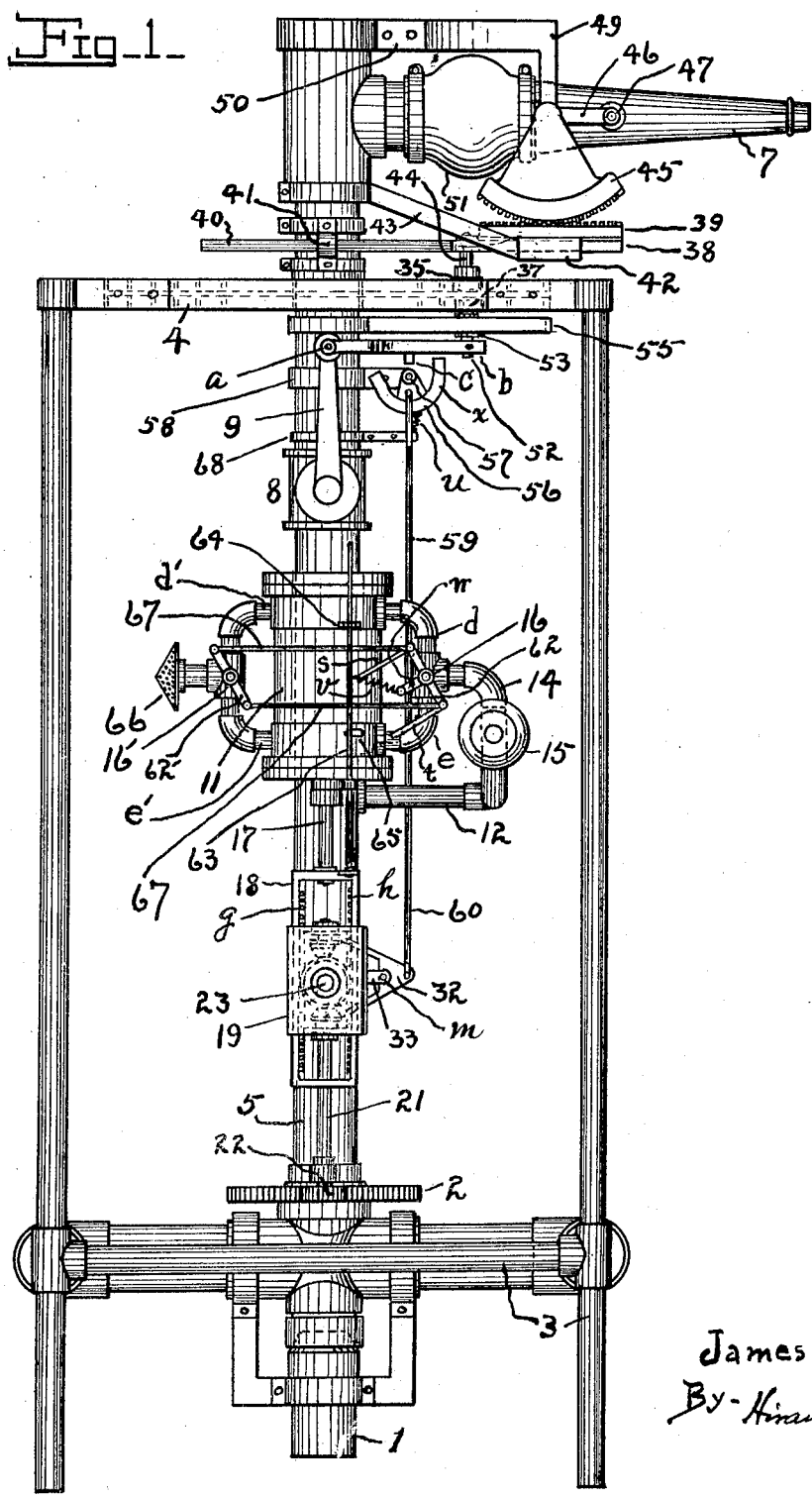
Figure 2:
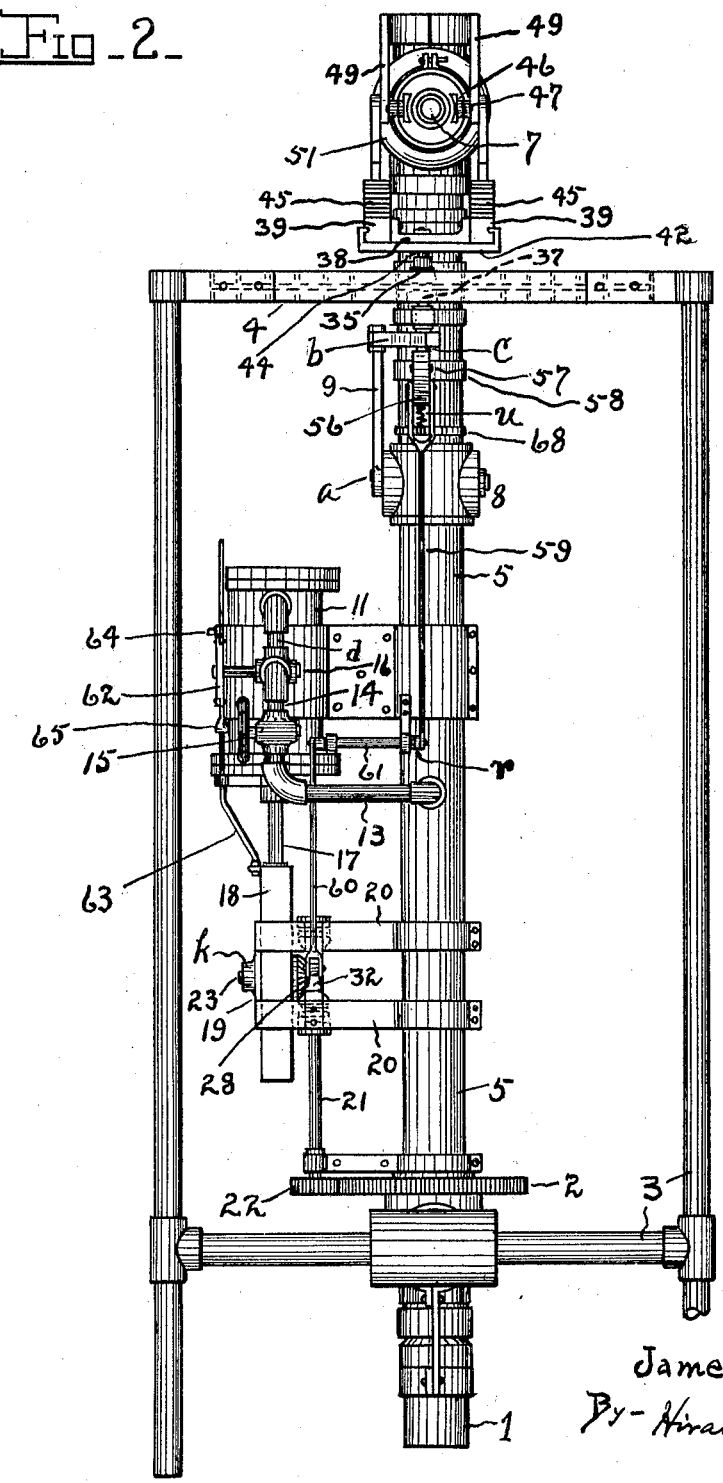
Figure 3:
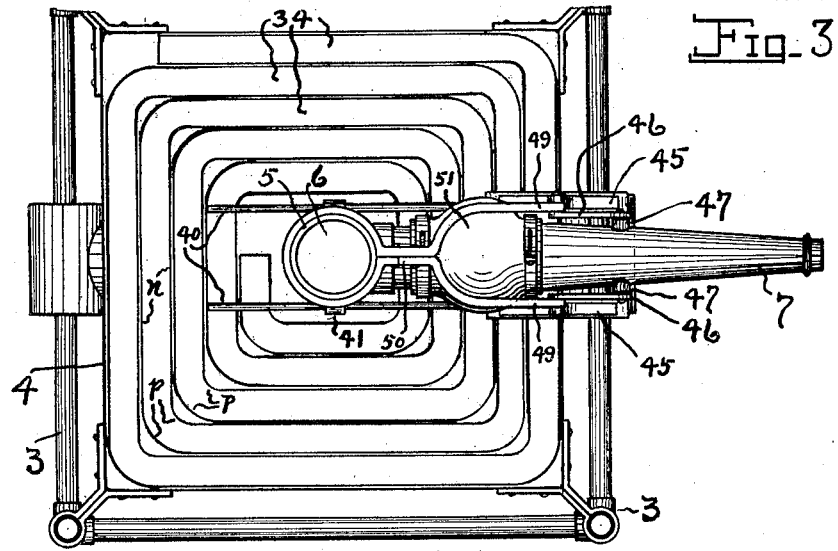
Figure 4:
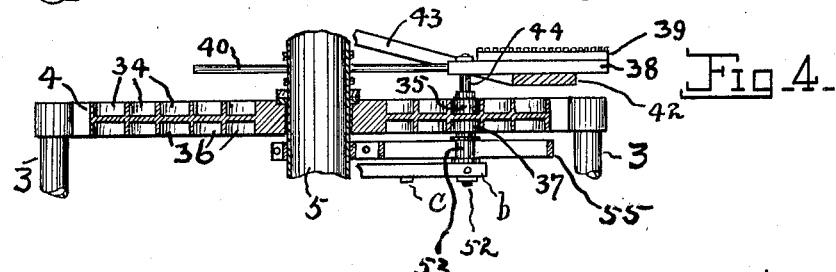
Figure 5:
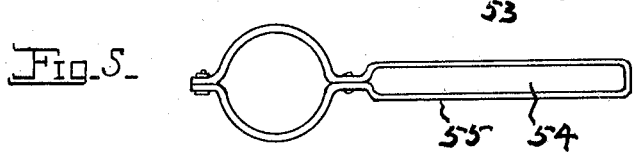
Figure 8:
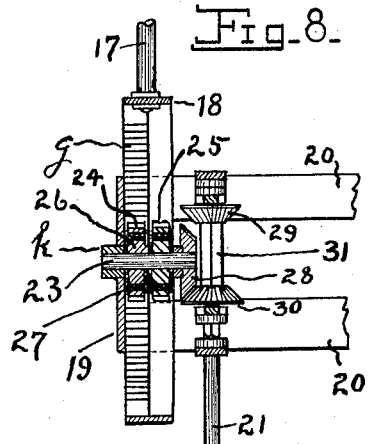
Figure 6:
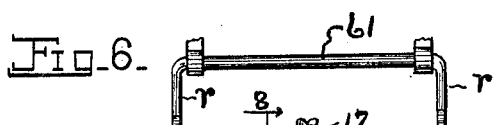
Figure 7:
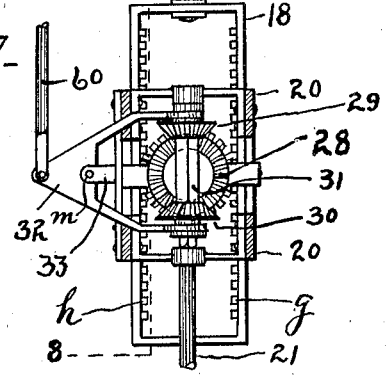

In the drawing Figure 1 is a view in side elevation of an irrigating apparatus embodying the invention. Fig. 2 is a view of the same taken at right angles to the view shown in Fig. 1. Fig. 3 is a plan view of the apparatus. Fig. 4 is a sectional view of the grooved platform or roller-guide. Fig. 5 is a plan view of a guide for a wrist-pin or spool. Fig. 6 is a plan view of a coupling bar. Fig. 7 is an enlarged detail relating to Figs. 1 and 2 to clearly show the two-part rack which is movable for rotating an operating shaft. Fig. 8 is a sectional view on line 8—8 of Fig. 7. Fig. 9 is a sectional view showing the cylinder and its tubes. Fig. 10 is a plan view of a sector. Fig. 11 is a plan view of the arm for a valve-spindle. Figs. 12 and 13 are side views of a pair of pinions. Fig. 14 is a sectional view of a speed-control valve. Fig. 15 is a detail showing bearings for the revoluble conducting pipe. Fig. 16 is a detail showing the movable gear-wheels for the operating shaft. Fig. 17 is a sectional view on line 17—17 of Fig. 16.

Referring now to the drawings, numeral 1 indicates the upper end of a stationary pipe for supplying water under pressure, said pipe upon its upper end, having an annular rack or gear wheel 2 rigidly mounted thereon, a frame 3 being provided having any required number of parts for a support of said pipe 1 and having a suitable height for a mounting upon its upper end of a horizontal platform or roller-guide 4.

Numeral 5 indicates a revoluble conducting-pipe which projects above and traverses the platform 4, said pipe being in communication with pipe 1, and its upper end having a closure cap 6 (Fig. 3) and provided near its upper end with a nozzle 7.

Means are provided for increasing and decreasing the volume of water which passes through the nozzle, consisting, in part, of a valve 8, upon the stem of said valve being mounted a spindle 9, and upon the upper end of said spindle being pivotally mounted, as indicated, at $a$, an arm $b$ provided with a lug $c$, said valve 8 having a valve seat in the pipe 5.

Means are provided for causing an oscillatory movement of the pipe 5, consisting in part, of a piston 10 adapted to play in a cylinder 11 which is disposed below the valve 8, said piston being moved downwardly by force of the water from pipe 5, the water passing through tubes 12, 13, and 14 to a two-way pipe indicated at $d$ and $e$, after a start and stop valve 15 has been opened, said movement of water to the cylinder being also subject to the control of a valve 16.

Water under pressure entering the cylinder 11 will cause a downward movement of the piston 10 and its piston rod 17. Mounted upon the lower end of the piston rod is a rack-bar 18 preferably formed as a rectangular frame, upon the opposed sides of said frame being provided teeth respectively indicated at $g$ and $h$, said teeth being disposed in adjacent planes with reference to each other, said rack-bar being mounted and adapted to have slidable movements in a suitable frame 19 supported by clips 20.

The vertical movements of the rack-bar above mentioned are depended upon to cause oscillatory movements of a vertical operating-shaft 21 provided at its lower end with a pinion 22 in engagement with the stationary gear wheel 2, and in order that this may be accomplished I provide a stubshaft 23 having bearings in the frame 19 and its boss $k$, said shaft 23 being provided with a pair of ring gears or pinions 24 and 25, respectively adapted to engage the teeth $g$ and $h$ of the rack-bar 18. Each pinion 24 and 25 is provided interiorly with a ratchet wheel 26 and a plurality of rollers 27, said ratchet wheels being keyed on the shaft 23, and the rollers normally being disposed loosely between the teeth, and it will be understood that the shaft 23 will rotate in one direction only, for a downward movement of the rack 18 will obviously cause a rotation of the wheel 24 in a direction indicated by the arrow shown in Fig. 12, its teeth engaging the teeth $h$ of the rack, the rollers 27 for said wheel being pressed against the wheel-rim so that the ratchet wheel will move in the same direction as said wheel 24; also it will be seen that during the downward movement of the rack, the wheel 25 will move in a reverse direction to the movement of the wheel 24, the rollers between the rim of said wheel 25 and its ratchet-wheel being then disengaged from said rim. Numeral 28 indicates a miter gear wheel which is mounted upon the inner end of the shaft 23, said wheel being adapted to engage the miter gear wheels 29 and 30 in alternation, these last named wheels being mounted on the sleeve 31 (Figs. 16, 17,) which is adapted to have slidable movements on an extension 31′ of the operating shaft 21, as best shown in Figs. 8 and 16, the sleeve 31 and said shaft-extension 31′ preferably being angular in cross-section. The sleeve 31 and wheels 29 and 30 mounted thereon have the movements mentioned by means of the rocking movements of a bell-crank 32 which is pivotally mounted, as indicated at $m$ upon a bracket 33 of the frame 19.

It will be understood that a swinging movement of the bell-crank 32 in one direction will cause engagement of the gear wheel 29 with the wheel 28 to cause the shaft 21 to rotate in one direction, and that a swinging movement of the bell-crank in an opposite direction will cause engagement of the gear wheel 30 with said wheel 28, to cause the shaft 21 to rotate in an opposite direction, the result of the rotation of said shaft being that the conducting pipe 5 will be revolved first in one direction and then in another, the nozzle 7, cylinder 11 and other parts mounted on said pipe 5 moving therewith.

The rectilinear platform or roller-guide 4 has a groove 34 formed in its upper side which extends from near its middle to its outer edge, the walls $n$ of said groove being rectilinear and parallel with its sides, and the walls $p$ of said groove, adjacent to the corners of the platform, being of curved form to permit a roller 35 to move around the tube 5 in said groove, and at 36 is indicated a groove which is formed in the lower side of the platform, opposite to the groove 34, said groove 36 conforming in all respects to the groove 34 and the walls thereof, and in said groove 36 a roller 37 is adapted to move.

Numeral 38, best shown in Fig. 2, indicates a slide-plate provided at its opposed sides with rack-bars 39, said plate being provided at its inner end with a pair of arms 40 adapted to loosely engage in staples or loops 41, said plate 38 being slidably mounted upon a yoke 42 having its arms 43 secured to the pipe 5, and it will be understood that the plate 38, together with the rack-bars 39 may have slidable movements on the yoke 42, outwardly from or toward the pipe 5, the lower side of the slide-plate 38 being provided with a pivot-pin 44 on which the roller 35 is mounted.

Numeral 45 indicates a pair of toothed sectors in engagement with the rack-bars 39, each being provided at its upper end with an angularly formed arm 46 (Figs. 1, 10,) having a pivotal mounting 47 in a side of the nozzle 7, between the ends thereof, each arm 46 having a pivotal mounting for its inner end upon an L-shaped arm 49 of a yoke 50 which is secured to the pipe 5.

The nozzle 7 is provided with a section 51 of india rubber or other flexible material, and it will be understood that if the plate 38 and its rack-bars 39 are moved outwardly from the pipe 5, the sectors 45 will have a rocking movement and will cause the outer ends of the arms 46 to swing upwardly for causing an upward swinging movement of the nozzle, this being a desirable feature during operation, so that water may be thrown to a considerable distance, an inward slidable movement of the plate 38 and its rack-bars obviously causing a downward inclination of the nozzle to deliver water therefrom at a lesser distance from the pipe 5, the sectors 45 having a rigid connection with arms 46.

As described it will be understood that the revoluble movements of the pipe 5 will cause the rollers 35 and 37 to move in their respective grooves 34 and 36, said rollers at times being disposed near the pipe 5 and at other times being disposed comparatively remote therefrom. The roller 37 is mounted on a pivot-pin 52 which has a mounting in the arm $b$ of the spindle $g$, and upon the pin 52 is mounted a spool 53 which engages loosely in the slot 54 (Fig. 5) of a guide-arm 55, the latter being rigidly mounted on the pipe 5; and therefore a movement outwardly from the pipe 5 of the rollers 35 and 37, in their respective grooves, will cause a movement in the same direction of the arm $b$ and spindle 9, this operation causing an increase in the volume of water discharged from the nozzle since the valve 8 will be moved from its seat, this being a desirable feature during operation since the nozzle will then be inclined upwardly for discharging water to a greater distance.

At 56 is indicated a U-shaped latch which is pivotally mounted as indicated at 57 upon an arm or clip 58 secured to the pipe 5; and when the rollers 35 and 37 move in their grooves outwardly of the platform, the lug $c$ will engage the arm $x$ of the latch and will cause it to swing in a limited arc, this swinging movement causing an upward movement of the pull-and-push rods 59 and 60 for moving the bell-crank 32, which results in moving one of the miter gears 29 and 30, into engagement with the miter gear wheel 28, as above described, a rotatably mounted coupling-bar 61 having angularly disposed arms $r$ being employed for connecting the inner ends of said rods 59 and 60.

The valve 16, best shown in Fig. 9, is adapted to be rotated approximately 90 degrees, in alternation, to permit water to pass through the pipes $d$ and $e$. Mounted on the stem of the valve 16 is a rock-lever 62, its ends being provided with a pair of parallel arms, indicated at $s$ and $t$. The rack-bar 18 is provided, to project above its upper end, with an actuating-bar 63, the upper end of said bar engaging in a guide or staple 64 and being provided with a lug 65; and during the movements of the rack-bar the lug 65 will engage the arms $s$ and $t$ in alternation for causing the rotatable movement of the valve 16, water under pressure entering the cylinder 11 through pipe $d$ causing the piston and rack-bar 18 to move downwardly, and when entering the cylinder through pipe $e$ the water, under pressure, will cause the piston and rack-bar to move upwardly.

Numeral 66 indicates a sprinkler adapted to discharge water which moves from the cylinder through pipes $d'$ and $e'$ subject to the control of a valve 16', the use of this sprinkler being of advantage for irrigating such areas as are not irrigated by water discharged from the nozzle 7.

The stem of the valve 16' is provided with a rock-lever 62'. Numerals 67 indicate a pair of coupling-rods each having its ends pivotally mounted upon the levers 62 and 62', at the ends thereof, and it will be understood that when water enters the cylinder through a pipe $d$ the valve 16' will prevent water from passing to the sprinkler 66 through the pipe $d'$, whereby the force of water is economized for moving the piston downwardly; and during the downward movement of the piston it is obvious that water will move from that part of the cylinder below the piston to be discharged from the sprinkler.

When water enters the cylinder through the pipe $e$ the piston will move upwardly and the valve 16' will prevent water from moving to the sprinkler through the pipe $e'$ but will permit water to move from the upper part of the cylinder through the pipe $d'$ to be discharged from the sprinkler.

Spiral springs are indicated at $u$ and $v$. The spring $u$ is mounted at one of its ends upon a clip 68, its opposite end being connected with the U-shaped latch 56, the function discharged by said spring being to maintain the latch in a stationary position after it has been engaged by the lug $c$ of the arm $b$. In operation, the lug $c$ will engage the arms of said latch in alternation and it will cause swinging movements of the latch on its pivot 57, and after the middle part of the U-shaped latch has been swung beyond the axis of the rod 59 the spring will cause a rapid swinging movement of the latch for effecting an immediate swinging movement of the bell-crank 32 to change engagement of the gears 29 and 30 above mentioned.

The spring $v$ is mounted at one of its ends upon the wall of the cylinder 11 in the horizontal plane of valves 16 and 16', its opposite end being mounted upon an arm $w$ of the stem of the valve 16, its function being to cause a rapid swinging movement of the rock-lever 62 after the lug 65 has engaged and has moved one of arms $s$ or $t$ in an arc, approximately, of 90 degrees.

When the rack-bar 18 moves upwardly the lug 65 will engage the arm $s$ of the rock-lever 62 and will cause an upward swinging movement of the arm $s$, the spring $v$ being compressed until the arm $w$ is disposed approximately at right angles to the longitudinal axis of the cylinder 11. The spring $v$ then operates to move the valve 16 quickly to its seat.

It will be appreciated that the herein described apparatus operates to great advantage for irrigating rectangular areas of land, no attention of an operator being required, the inclination of the nozzle changing automatically so that the water will be delivered to remote as well as central parts of the area while the conducting tube is slowly revolving, the greater or lesser volume of water delivered corresponding to the distance of the parts of the area from the apparatus, the sprinkler being of such form and proportion that areas adjacent to the apparatus will be irrigated, so that water will be delivered uniformly or practically so to the entire area to be irrigated.

It will be understood that the pipe 5 will not rotate uniformly, its movement being slower while the rollers 35 and 37 are moving in the curved parts of their grooves, adjacent to the corners of the platform, the result in operation being that the quantity of water delivered to a rectangular area will be practically uniform.

I claim:

1. An irrigating apparatus, comprising, in combination with a frame provided with a stationary annular rack, an upright pipe journaled in the frame, said pipe having a nozzle and a valve seat and adapted to conduct water under pressure, a horizontal, stationary platform traversed by said pipe and having grooves formed in its upper and lower sides which surround and are disposed at varying distances from said pipe, a cylinder secured to and having a piston arranged to be moved by pressure of the water from said pipe, a rack-bar longitudinally movable by said piston, an operating shaft having a pinion engaging the annular rack of the frame, a nest of gears movable by the rack-bar for actuating the operating shaft to cause a rotatable movement of said pipe, a valve provided with a spindle and mounted on the valve seat of said pipe, an arm pivotally connected with the spindle and having a roller engaging in the groove in the lower side of the platform, a slide-plate movable with said pipe, said plate being provided with a rack-bar and having a roller engaging in the groove in the upper side of the platform, and a toothed sector engaging the rack-bar of the slide-plate and having an arm pivotally mounted on said nozzle.

2. An irrigating apparatus, comprising, in combination with a stationary, annular rack, a rectangular, horizontal platform formed in its upper and lower sides with grooves which surround and are disposed at varying distances from near its middle toward its edges, an upright pipe traversing the platform approximately at its middle and adapted to conduct water under pressure, said pipe being provided with a nozzle and a valve seat, mechanism connected with said nozzle, an operating shaft carried by said pipe, and having a pinion engaging the stationary, annular rack, a piston movable by the pressure of water from said pipe, mechanism movable by the piston for rotating the operating shaft to cause a revoluble movement of said pipe, a roller movable in the groove in the upper side of the platform by the revoluble movement of said pipe, mechanism connected with said roller and with the mechanism of said nozzle for changing the inclination of the nozzle, a roller movable in the groove in the lower side of the platform by the revoluble movement of said pipe, and mechanism connected with said last named roller and said valve for causing a movement of the valve.

3. In an irrigating apparatus, the combination of an upright pipe for conducting water under pressure, said pipe being provided with a nozzle and a valve seat, a stationary, annular rack, a piston movable by the pressure of water from said pipe, an operating shaft having a pinion engaging the stationary, annular rack, mechanism to cause actuation of the operating shaft by the movement of the piston for rotating said pipe, a stationary, horizontal platform having grooves disposed at varying distances outwardly from near its middle, a horizontal slide-plate movable with the pipe and provided with a rack-bar and having a roller disposed in a groove of the platform, toothed sectors engaging the rack-bar each having an arm pivotally mounted on said nozzle, a valve on said valve seat and provided with a spindle, and an arm pivotally connected with the spindle and having a roller disposed in a groove of the platform.

4. In an irrigating apparatus, the combination of a stationary, annular rack, an approximately vertical pipe adapted to conduct water under pressure said pipe being provided with a nozzle and a valve seat, a piston movable by the pressure of water from said pipe, an operating shaft having a pinion engaging the stationary annular rack, means to cause a revoluble movement of the operating shaft by the movement of the piston for revolving said pipe, toothed sectors each having an arm pivotally mounted on said nozzle, a slide-plate movable with the pipe and having rack-bars engaging the sectors, a platform traversed by and having grooves surrounding and disposed at varying distances from said pipe, a roller engaging in a groove of the platform and movable with the slide-plate for moving the nozzle vertically, a valve provided with a spindle and disposed on said valve seat, a second roller, said second roller being connected with the spindle and being movable in a groove of the platform by the revoluble movement of the pipe for moving said valve.

5. An irrigating apparatus, comprising, in combination with an upright, revoluble pipe for conducting water under pressure, said pipe being provided with a nozzle and having a valve seat, a horizontal platform traversed by and having grooves surrounding and disposed at varying distances from said pipe, a plate provided with rack-bars, said plate being mounted upon and movable with the pipe and having a roller engaging in a groove of the platform to cause said plate to move transversely of the pipe, toothed sectors each having an arm pivotally mounted on the nozzle and engaging a rack-bar, a valve provided with a spindle, and an arm connected with the spindle and having a roller movable in a groove of the platform for moving said valve.

6. In an irrigating apparatus, an upright, revoluble pipe provided with a nozzle, a stationary platform traversed by the pipe and having a groove surrounding and disposed at varying distances from said pipe, a slide-plate movable circularly by the revoluble movements of the pipe, said plate being provided with a rack-bar and having a roller engaging in the groove, and a toothed sector engaging the rack-bar and having an arm pivotally connected with the nozzle.

7. In an irrigating apparatus, an upright, revoluble pipe provided with a nozzle and a valve seat, a stationary platform traversed by and having a groove surrounding said pipe, a valve on said valve seat and provided with a spindle, and an arm pivotally connected with the spindle and having a roller engaging in the groove of the platform, said groove being disposed at varying distances from the pipe to cause swinging movements of said arm and spindle for moving the valve.

In testimony whereof, I have affixed my signature in presence of two witnesses.

JAMES A. NORTON.

Witnesses:
HIRAM A. STURGES,
ARTHUR H. STURGES.